A. C. HEAP.
ELECTRIC CONTACTING DEVICE.
APPLICATION FILED MAY 20, 1919.
1,402,420.
Patented Jan. 3, 1922.
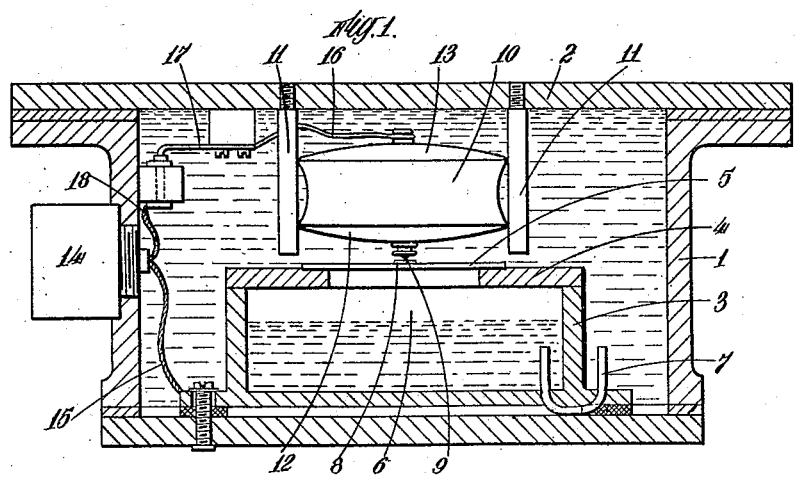
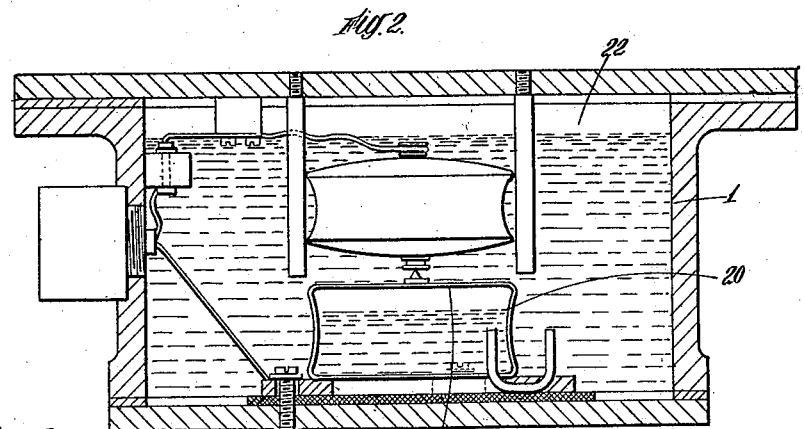
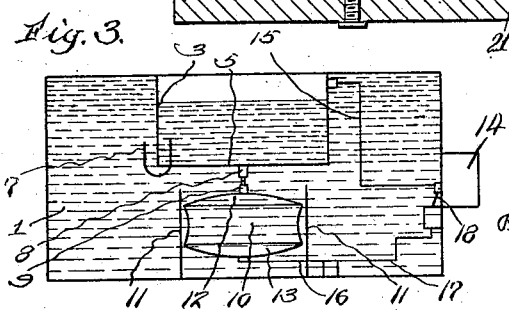
Arthur Cecil Heap, Inventor,
Pennie, Davis, Marvin & Edmonds,
attorneys.

UNITED STATES PATENT OFFICE.

ARTHUR CECIL HEAP, OF WOKING, ENGLAND.

ELECTRIC CONTACTING DEVICE.

1,402,420. Specification of Letters Patent. Patented Jan. 3, 1922.

Application filed May 20, 1919. Serial No. 298,551.

*To all whom it may concern:*

Be it known that I, ARTHUR CECIL HEAP, a subject of the King of Great Britain, residing at "Oatlands," Ashwood Road, Woking, England, have invented certain new and useful Improvements in or Relating to Electric Contacting Devices, (for which I have filed an application in Great Britain, No. 8164, dated May 15, 1918, of which the following is a specification.

This invention relates to electric contacting devices of the kind in which an electrode is carried on a float immersed in a liquid and which contacting device may be of the "dancing contact" type, that is to say, one in which the contacts actually separate in operation as distinct from microphonic contacts in which the resistance of the contacts is merely varied.

Such contacting devices are particularly suitable for use on fixed and movable buoys or mines floating on or submerged in water, the devices being adapted to be operated by sound waves or pulses transmitted through the surrounding sea water.

The float may be in the form of a short hollow cylinder the end faces of which form diaphragms, the associated electrode being fixed to one of the said end faces. The float may be floated in oil in a container and the other electrode may be attached to a diaphragm.

The sensitivity of contact devices of the kind referred to is dependent upon the force with which the contacts are normally pressed together. The force between the contacts is produced by the difference in weight between the float and the volume of oil which the float displaces. Changes of temperature affect the devices in the following manner. For example, increase of temperature produces the following results:—(1) Expansion of the oil and consequent lowering of its density; (2) Expansion of the oil and consequent diminution of the volume of air space in the oil container resulting in an increased pressure of this air. At the same time the temperature of the included air rising gives a further increase in air pressure; (3) Increase in the air pressure within the float and consequently a distortion of the float which tends to increase the volume of the oil displaced. The second and third effects depend upon the relative volumes of the air and oil in the container and on the initial pressure of the air in the container and in the float.

According to one feature of this invention the volumes and the air pressures in the container and in the float are so determined that the sensitivity of the device is practically compensated for temperature changes as far as sensitivity is concerned—that is to say— the combination of the first second and third results due to change of temperature, as hereinbefore set forth, are made to practically vanish.

The desired result may also be obtained according to another feature of this invention by arranging one of the contacts on a diaphragm the fluid pressures on the two sides of which are balanced and equal to the pressure to which the float is subjected.

In order that this feature of the invention may be clearly understood and readily carried into effect the same will now be more fully described with reference to the accompanying drawings in which Figure 1 is a sectional elevation of one form of contacting device according to this feature of the invention. Figure 2 is a sectional elevation of another form of contacting device according to this feature of the invention. Figure 3 is a diagrammatic view of an inverted form of the contact device shown in Figure 1.

Referring to Figure 1 the device comprises a container 1 closed by a plate or cover 2 and containing oil. Fixed to the base of the container 1 is a receptacle 3 closed at the top by an annular plate 4 and a diaphragm 5 fixed thereto. The receptacle 3 is partially filled with oil leaving a space 6 filled with air beneath the diaphragm 5. The masses of oil inside and outside the receptacle 3 are connected through a pipe 7 thereby providing a balanced pressure on the two sides of the diaphragm 5 irrespective of temperature changes or external hydrostatic pressure changes of the whole container. One of the contacts 8 of the device is fixed to the upper side of the diaphragm 5, the other contact 9 being carried on a hollow float 10 of slightly greater density than the oil. The float 10 is kept in position by rods such as 11 attached to the cover 2. Only two rods 11 are shown but three or more are provided. The float 10 may consist of an aluminum box with sufficiently thick walls to avoid appreciable changes of volume with changes of internal air pressure. The end walls 12 and 13 of the float may be domed outwards as shown. Electrical connection is made to the contact 8 from a terminal box 14 by a wire 15 connected to the receptacle 3 and connection to the contact 9 by a wire 16, conductor 17 and wire 18.

The sound disturbance propagated through the external sea water is directly transmitted through the metal container walls into the oil, which is shielded from other external pressure effects, and operates the contacts 8 and 9 to give an indication.

The thickness of the diaphragm 5 may be of any desired value from an acoustic point of view, and chosen irrespectively of all of the other varying conditions referred to. On account of the complete equalization of pressure on the two sides of the diaphragm, except for pulses at sound frequencies, thin diaphragms of even fragile material may be employed such as quartz or carbon. The container walls are made of substantial thickness and are able to sustain severe handling, explosive shocks, etc., without damage or distortion.

In the form of the device shown in Figure 2 the receptacle 3 and diaphragm 5 are replaced by a thin-walled receptacle 20 the end wall 21 of which takes the place of the diaphragm 5. In this form of the device the container 1 is shown as only partially filled with oil, a space filled with air being left at 22.

Instead of making the float of greater density than the oil it may be made of less density and arranged below the diaphragm, as shown in Figure 3.

The diaphragm or end wall of the float which does not carry a contact may be made of thicker material than that used for the other, or the first mentioned of these diaphragms may be domed. In Figures 1 and 2 both diaphragms are shown domed. In some cases it is desirable to dome the diaphragm inwards instead of outwards since the method of doming influences the manner in which float tends to move bodily through the oil. This feature of the invention is applicable to contacting devices of the kind referred to whether the balanced pressure arrangement is employed or not.

What I claim and desire to secure by Letters Patent of the United States is:—

1. An electric contacting device of the kind referred to, comprising a vessel forming a container for liquid, a float immersed in said liquid, and a pair of contacts, one of which contacts is carried on said float, the volume and the air pressures in the container and in the float being determined so as to compensate for or neutralize the effect on the sensitivity of the device of temperature changes.

2. An electric contacting device of the kind referred to, comprising a pair of contacts, a float carrying one of said contacts and a diaphragm carrying the other of said contacts, the two sides of said diaphragm being subjected to fluid pressures which are balanced and equal to the pressure to which the float is subjected, for the purpose described.

3. An electric contacting device of the kind referred to, comprising a pair of contacts, a float carrying one of said contacts, a diaphragm carrying the other of said contacts and a fluid containing chamber one wall of which is formed by said diaphragm, there being a passage between the interior and exterior of said chamber for the purpose described.

4. An electrical contacting device of the kind referred to, comprising a float, a vessel forming a container for liquid, a pair of contacts one of which is carried by said float, and a diaphragm carrying the other of said contacts, the said float having an end wall of dome shape.

In testimony whereof I affix my signature.

ARTHUR CECIL HEAP.